(12) United States Patent
Yamamura et al.

(10) Patent No.: US 10,454,287 B2
(45) Date of Patent: Oct. 22, 2019

(54) CHARGING STATION FOR UTILITY VEHICLE

(71) Applicant: Honda Motor Co., Ltd., Tokyo (JP)

(72) Inventors: Makoto Yamamura, Wako (JP); Toshiaki Kawakami, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 282 days.

(21) Appl. No.: 15/473,500

(22) Filed: Mar. 29, 2017

(65) Prior Publication Data

US 2017/0282735 A1 Oct. 5, 2017

(30) Foreign Application Priority Data

Mar. 31, 2016 (JP) .................... 2016-071943

(51) Int. Cl.
| | |
|---|---|
| *B60L 1/00* | (2006.01) |
| *B60L 3/00* | (2019.01) |
| *H02G 3/00* | (2006.01) |
| *H02J 7/00* | (2006.01) |
| *G05D 1/02* | (2006.01) |
| *B60L 53/14* | (2019.01) |
| *B60L 53/36* | (2019.01) |

(Continued)

(52) U.S. Cl.
CPC ............ *H02J 7/0027* (2013.01); *B60L 53/14* (2019.02); *B60L 53/36* (2019.02); *G05D 1/0225* (2013.01); *G05D 1/0265* (2013.01); *H02J 7/0045* (2013.01); *A01D 34/008* (2013.01); *B60L 2200/40* (2013.01); *G05D 2201/0208* (2013.01); *H02J 7/022* (2013.01);

*Y02T 10/7005* (2013.01); *Y02T 10/7072* (2013.01); *Y02T 90/121* (2013.01); *Y02T 90/125* (2013.01); *Y02T 90/14* (2013.01)

(58) Field of Classification Search
CPC ... H02J 7/0027; A01D 34/008; G05D 1/0225; G05D 1/0226; G05D 1/0265; G05D 2201/0208; Y02T 90/125; B60L 53/36
See application file for complete search history.

(56) References Cited

U.S. PATENT DOCUMENTS

2005/0267629 A1* 12/2005 Petersson ............. A01D 34/008
700/245
2008/0183349 A1* 7/2008 Abramson ........... A01D 34/008
701/23

(Continued)

FOREIGN PATENT DOCUMENTS

JP 2013164741 A 8/2013

*Primary Examiner* — Rexford N Barnie
*Assistant Examiner* — Rasem Mourad
(74) *Attorney, Agent, or Firm* — Duft & Bornsen, PC

(57) ABSTRACT

A charging station for a utility vehicle that detects a magnetic field generated by electric current flowing through a boundary wire, there are provided with a base plate installed at the working area to retain the vehicle and provided with a pair of charging terminals connectable with battery charging terminals of the onboard battery, a first wire having a first loop and first projecting segments that project from the first loop toward the base plate, and a second wire installed at the base plate and is connected to the electric power supply independently of the boundary wire and the first wire and having a second loop and second projecting segments that project from the second loop toward the base plate symmetrically with the first projecting segments.

18 Claims, 13 Drawing Sheets

(51) Int. Cl.
*A01D 34/00* (2006.01)
*H02J 7/02* (2016.01)

(56) References Cited

U.S. PATENT DOCUMENTS

| | | | | |
|---|---|---|---|---|
| 2011/0202307 A1* | 8/2011 | Petereit | ................ | A01D 34/008 |
| | | | | 702/150 |
| 2011/0234153 A1* | 9/2011 | Abramson | ........... | A01D 34/008 |
| | | | | 320/107 |
| 2013/0211645 A1* | 8/2013 | Yamamura | ........... | G05D 1/0225 |
| | | | | 701/22 |
| 2015/0366137 A1* | 12/2015 | Markusson | .............. | G05D 1/03 |
| | | | | 320/107 |
| 2015/0371771 A1* | 12/2015 | Abu Qahouq | ....... | H04B 5/0087 |
| | | | | 307/104 |
| 2016/0285288 A1* | 9/2016 | Yamamura | ........... | G05D 1/0225 |

* cited by examiner

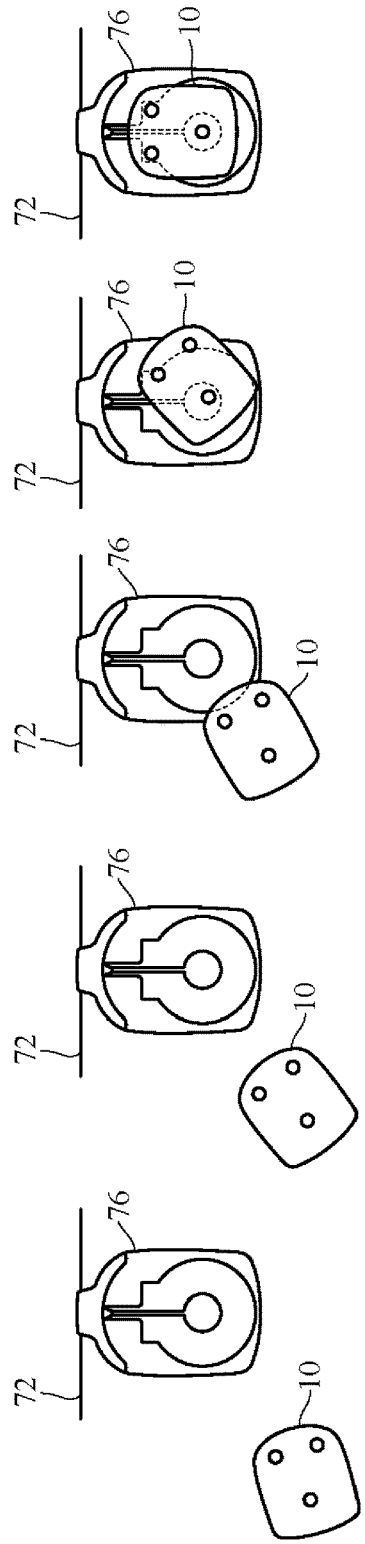

CHARGING STATION FOR UTILITY VEHICLE

CROSS-REFERENCE TO RELATED APPLICATIONS

This application is based upon and claims the benefit of priority from Japanese Patent Application No. 2016-071943 filed on Mar. 31, 2016, the contents of which are incorporated herein by reference.

BACKGROUND OF THE INVENTION

Field of the Invention

This invention relates to a charging station for a utility vehicle driven by electric motors that is charged at a charging station.

Description of Related Art

There is known a utility vehicle driven by electric motors to perform work while running a working area delineated by a boundary wire as taught, for example, by Japanese Unexamined Patent Publication No. JP2013-164741A. The technique described in this reference controls the utility vehicle return to a charging station installed above the boundary wire by driving it along the boundary wire on the basis of detected values from magnetic sensors when an onboard battery requires charging.

However, the technique described in the reference requires the charging station to be installed above the boundary wire and in an orientation parallel to the boundary wire, so that it has a problem of limiting freedom of charging station installation.

SUMMARY OF THE INVENTION

Therefore, an object of this invention is to provide a charging station for a utility vehicle to enhance freedom of charging station installation.

In order to achieve the object, this invention provides a charging station for a utility vehicle that detects a magnetic field generated by electric current flowing through a boundary wire, there are provided with a base plate installed at the working area to retain the vehicle and provided with a pair of charging terminals connectable with battery charging terminals of the onboard battery, a first wire having a first loop and first projecting segments that project from the first loop toward the base plate, and a second wire installed at the base plate and is connected to the electric power supply independently of the boundary wire and the first wire and having a second loop and second projecting segments that project from the second loop toward the base plate symmetrically with the first projecting segments.

BRIEF DESCRIPTION OF THE DRAWINGS

The above and other objects and advantages will be more apparent from the following description and drawings, in which:

FIGS. 16 and 17A to 17E are explanatory diagrams for explaining operation shown in the flowcharts of FIGS. 13 to 15.

DETAILED DESCRIPTION OF THE INVENTION

A charging station for a utility vehicle according to an embodiment of this invention is explained with reference to the attached drawings in the following.

Figure 1:
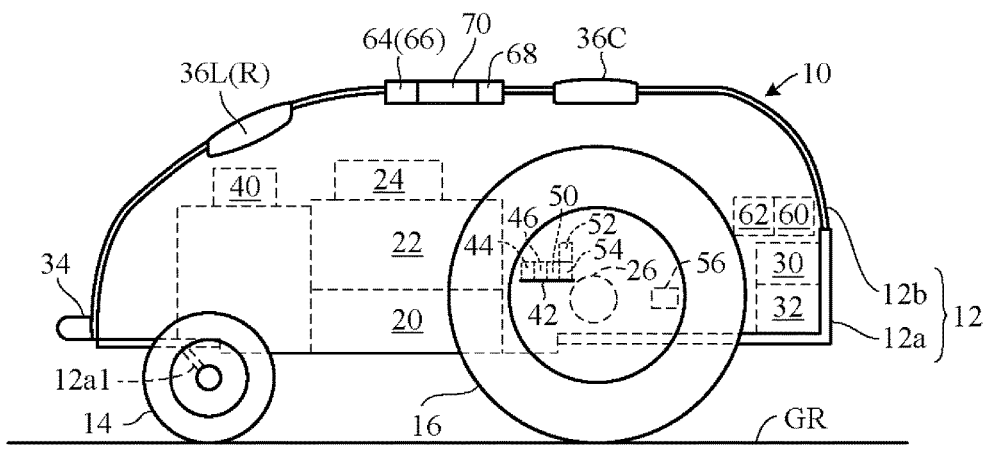
FIG. 1 is an overall schematic diagram showing a utility vehicle according to an embodiment of this invention.
Figure 2:
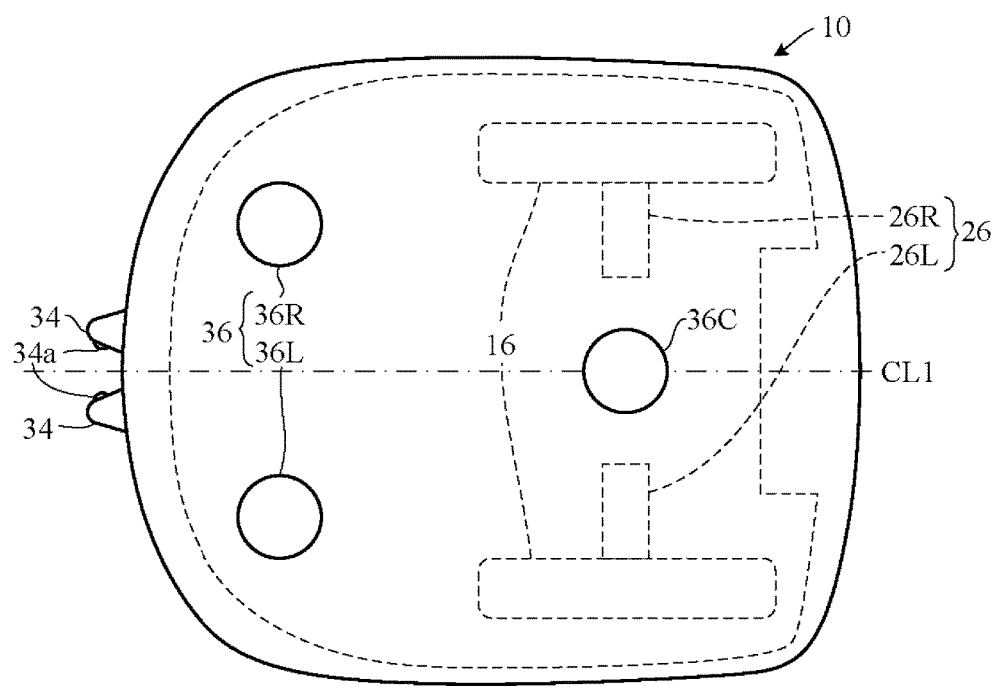
FIG. 2 is a plan view of the utility vehicle illustrated in FIG. 1.
Figure 3:
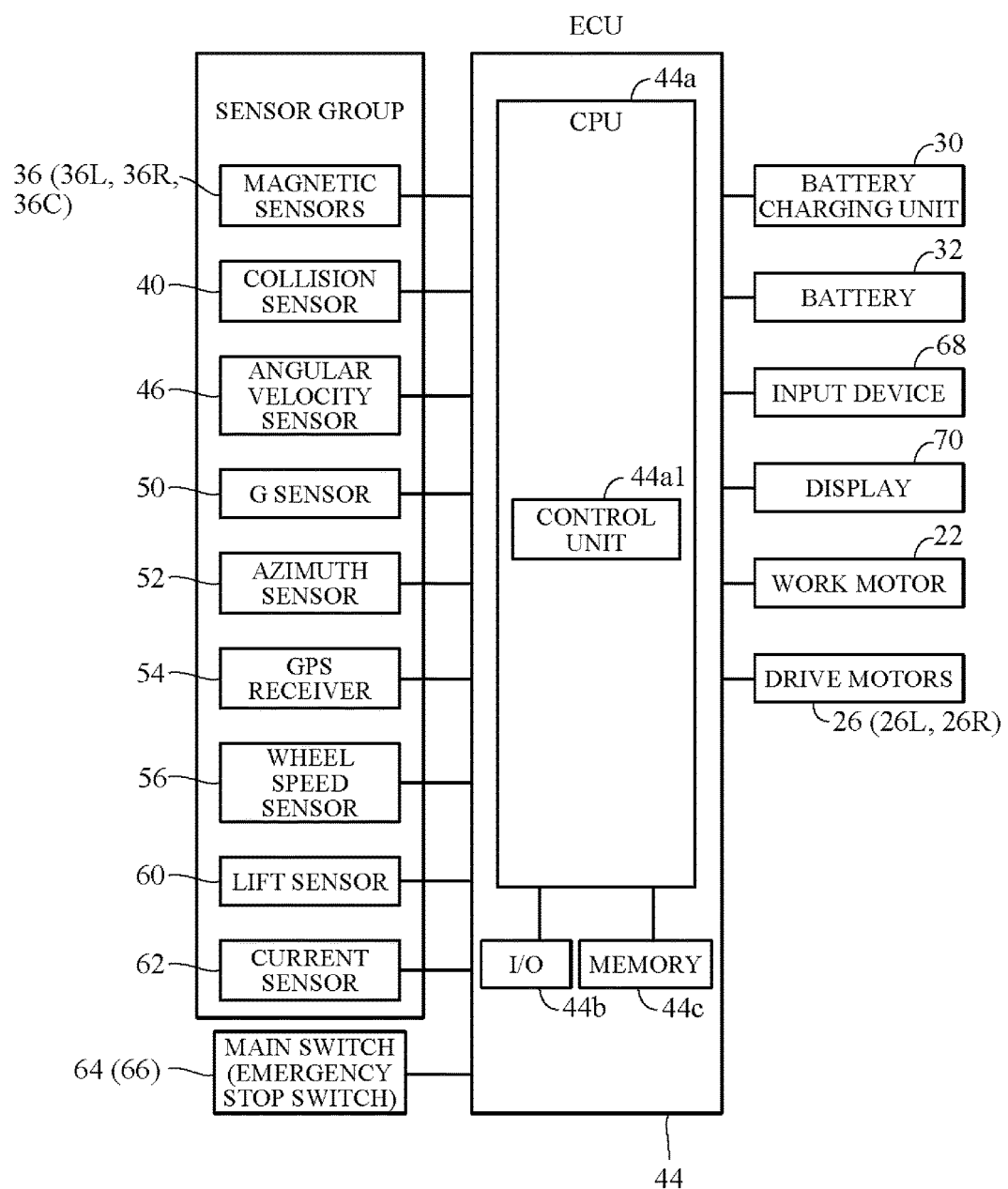
FIG. 3 is a block diagram showing inputs to an Electronic Control Unit installed in the utility vehicle illustrated in FIG. 1.

FIG. 1 is an overall schematic diagram showing a utility vehicle according to an embodiment of this invention, FIG. 2 is a plan view schematically illustrating the configuration of the utility vehicle illustrated in FIG. 1; and FIG. 3 is a block diagram showing the configuration of an electronic control unit (ECU) of the utility vehicle according to the present embodiment.

As shown in FIG. 1, reference symbol 10 designates a utility vehicle, more precisely an autonomously navigating utility vehicle, e.g., a mower; hereinafter called "vehicle".

The utility vehicle of the present invention can be embodied in the form of various types of utility vehicle and particularly as an autonomously navigating utility vehicle as a lawn mower for lawn or grass mowing work. In the following, the forward direction (longitudinal direction) of the utility vehicle in plan view and the vehicle width direction perpendicular to the forward direction are defined as the forward-rearward direction and the leftward-rightward direction, respectively, and the height direction of the utility vehicle is defined as the upward-downward direction. The configuration of the constituents is explained in line with these definitions.

A body 12 of the vehicle 10 comprises a chassis 12a and a frame 12b attached thereto. The vehicle 10 is equipped with relatively small diameter left and right front wheels 14 rotatably fastened to a front end of the chassis 12a through stays 12a1 and relatively large diameter left and right rear wheels 16 rotatably fastened to the chassis 12a directly.

A work unit, e.g., a mower blade (rotary blade) 20, is attached near the middle of the chassis 12a of the vehicle 10, and an electric motor (hereinafter called "work motor") 22 is installed above it. The blade 20 is connected to the electric motor 22 to be driven to rotate by the electric motor 22.

A blade height regulation mechanism 24 manually operable by an operator is connected to the blade 20. The blade height regulation mechanism 24 is equipped with a screw (not shown) and configured to enable the operator to regulate the height of the blade 20 above ground level GR by manually rotating the screw.

Two electric motors (hereinafter called "drive motors") 26 are attached to the chassis 12a of the vehicle 10 at a rear end of the blade 20. The drive motors 26 are connected to the left and right rear wheels 16 and rotate normally (drive the vehicle 10 to run forward) or reversely (drive the vehicle 10 to run backward) independently on the left and right, with the front wheels 14 as non-driven (free) wheels and the rear wheels 16 as driven wheels. The blade 20, work motor 22, drive motors 26 and so on are covered by the frame 12b.

The weight and size of the vehicle 1 are such that it can be transported or carried by the operator. As an example can be cited a vehicle 1 whose total length (forward-rearward direction length) is about 710 mm, total width about 550 mm, and height about 300 mm.

A battery charging unit 30 and an onboard battery 32 are housed at the rear of the vehicle 10, and a pair of charging terminals 34 are attached to the frame 12b so as to project forward. The battery 32 comprises lithium-ion battery, for example.

The charging terminals 34 are connected to the charging unit 30 through cables, and the charging unit 30 is connected to the battery 32 by cables. The work motor 22 and the drive motors 26 are connected to the battery 32 through connecting cables and are supplied with current from the battery 32. The cables are not shown in FIG. 1.

The vehicle 10 is thus configured as a 4-wheel, electrically-powered, autonomously navigating utility vehicle.

Left and right magnetic sensors 36 are installed at the front of the body 12 of the vehicle 10 at positions laterally symmetrical with respect to a center line extending in the straight forward direction of the vehicle 10. More specifically, as shown in FIG. 2, the first and second magnetic sensors 36R and 36L are installed laterally symmetrically with respect to a body center line CL of the vehicle body 12 running in the forward-rearward direction along the widthwise center of the vehicle 10. In addition, a third magnetic sensor 36C is installed on the body center line CL1 at a location remote from the sensors 36L and 36R. The magnetic sensors 36 produces an output indicating magnitude of magnetic field (magnetic field strength or intensity).

A collision (contact) sensor 40 is attached to the frame 12b. The collision sensor 40 outputs an ON signal when the frame 12b detaches from the chassis 12a owing to collision (contact) with an obstacle or foreign object.

A housing box (not shown) installed near the middle of the vehicle 10 houses a printed circuit board 42 carrying an ECU (Electronic Control Unit) 44, which comprises a microcomputer having CPU (microprocessor) 44a, I/O 44b, and memory (ROM, RAM, EEPROM, etc.) 44c and the like.

In the vicinity of the ECU 44 are installed an angular velocity sensor (yaw-rate sensor; yaw sensor) 46 that generates an output indicating angular velocity (yaw-rate) around a center-of-gravity z-axis (vertical axis) of the vehicle 10 (whose time-integrated value indicates a turn angle around the vertical axis), a G sensor (acceleration sensor) 50 that generates an output indicating acceleration G acting on the vehicle 10 in x, y and z (3-axis) directions, a direction sensor 52 that generates an output indicating direction (azimuth) of the vehicle 10 according to terrestrial magnetism, and a GPS (Global Positioning System) receiver 54 that receives satellite-transmitted GPS signals indicating position of the vehicle 10 (the GPS receiver 54 functions as a position sensor that detects position of the vehicle 10).

Wheel speed sensors 56 installed near the rear wheels 16 produce outputs indicating the wheel speeds of the rear wheels 16, and a lift sensor 60 installed between the chassis 12a and the frame 12b outputs an ON signal when the frame 12b is lifted off the chassis 12a by the operator or other worker. The vehicle 10 is equipped with a main switch 56 and an emergency stop switch 60 both operable by the operator. A current sensor 62 is installed at input/output circuit of the battery 32 and produces an output indicating consumed current of the battery 32.

A main switch 64 for inputting various commands of the operator, inter alia, start of operation, and an emergency stop switch 66 for inputting command for stopping the vehicle 10 in case of emergency are installed on the vehicle to be manipulatable by the operator. The top of the frame 12b of the vehicle 10 has a large cutaway in which an input device 68 for inputting commands of the operator and a display 70 is fitted. The input device 68 and display 70 are connected to the ECU 44. The display 70 displays working modes and the like in accordance with commands sent from the ECU 44.

As shown in FIG. 3, the outputs of the magnetic sensors 36, collision sensor 40, angular velocity sensor 46, etc., are sent to the ECU 44 through the I/O 44b. Based on the inputted data, the ECU 44 controls operation of the vehicle 10 by supplying current to the drive motor 26 from the battery 32 and by sending commands thereto through the I/O 44b.

Output shafts of the drive motors 26L and 26R are connected to rotating shafts of the left and right rear wheels 16, respectively, so as each to independently drive or rotate the left or right rear wheel 16. The drive motors 26L and 26R are configured such that they each independently rotates one of the rear wheels 16 normally (drive the vehicle 10 to run straight forward) or reversely (drive the vehicle 10 to run reverse). By establishing a difference between the rotating speeds of the left and right rear wheels 16, the vehicle 10 can be turned to an arbitrary direction.

For example, when the left and right rear wheels 16 are both rotated normally and the rotational speed of the right rear wheel 16 is greater than the rotational speed of the left rear wheel 16, the vehicle 10 turns left at a turning angle θ in accordance with the speed difference. Conversely, when the rotational speed of the left rear wheel 16 is greater than the rotational speed of the right rear wheel 16, the vehicle 10 turns right at a turning angle θ in accordance with the speed difference. When one of the left and right rear wheels 16 is rotated normally and the other reversely both at the same speed, the vehicle 10 turns on the spot (so-called "pivot-turn").

The vehicle 10 is configured to detect or recognize the working area AR based on the outputs of the aforesaid sensors, in particular the electromagnetic sensors 36 and perform the in the working area AR.

The detection of the working area AR and the work thereat will be explained with reference to FIG. 4.

The working area 70 is delineated by laying (burying) a boundary wire (electrical wire) 72 around its periphery (boundary). A charging station 76 for charging the battery 32 of the vehicle 10 is installed above the boundary wire 72 at a location inside or outside, more precisely inside the working AR. The sizes of the vehicle 10 and charging station 76 in FIG. 4 are exaggerated.

Figure 5:
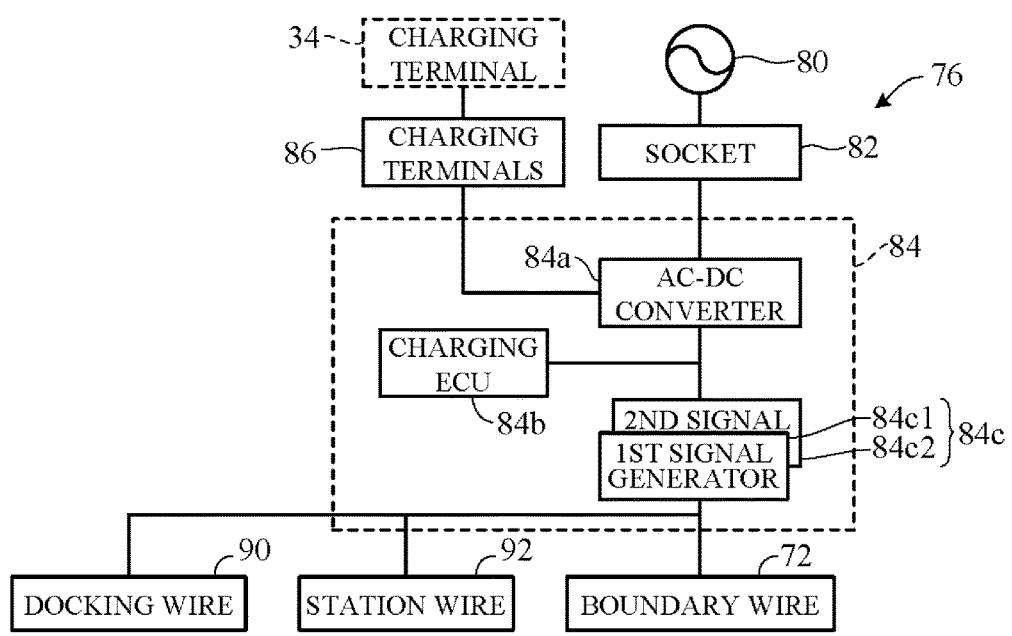
FIG. 5 is a block diagram showing configuration of a charging station of the utility vehicle shown in FIG. 4.

FIG. 5 is a block diagram showing electrical configuration of the charging station 76.

As shown in FIG. 5, the charging station 76 is equipped with a charger 84 connected through a socket 82 to a commercial power supply 80, and a pair of charging terminals 86 connected to the charger 84 and connectable to charging contacts 34a (shown in FIG. 2) of the pair of charging terminals 34 of the vehicle 10.

The charger 84 is equipped with an AC-DC converter 84a, a charging ECU (Electronic Control Unit) 84b also comprising a microcomputer and used to control operation of the AC-DC converter 84a, and two signal generators 84c (first signal generator 84c1 and second signal generator 84c2).

The charging station 76 is configured so that alternating current passing from the commercial power supply 80 through the socket 82 is converted to direct current and is stepped down to a suitable voltage by the AC-DC converter 84a of the charger 84 and sent to the charging terminals 86 to charge the onboard battery 32 through the charging terminals 32 and 86 when the vehicle 10 is returned and connected to the charging station 76. The AC-DC converter 84a steps down the current to a suitable voltage in response to commands determined by the ECU 44 and sent from the charging ECU 84b.

At the same time, the output of the AC-DC converter 84 is supplied to the charging ECU 84b and signal generators 84c (comprising a first signal generator 84c1 and a second signal generator 84c2). The charging ECU 84b is configured to be capable of communicating with the ECU 44 and controls operation of the first signal generators 84c1 and the second signal generator 84c2 by sending binary data pulses.

In response thereto, the first and second signal generators 84c1, 84c2 convert the direct current stepped down by the AC-DC converter 84a into area signal in continuance sequence of pulse train and supply the generated area signal to the boundary wire 72, a docking wire 90 for guiding the vehicle 10 to a charging position and a station wire 92 for delineating the charging station 76a.

Figure 6:
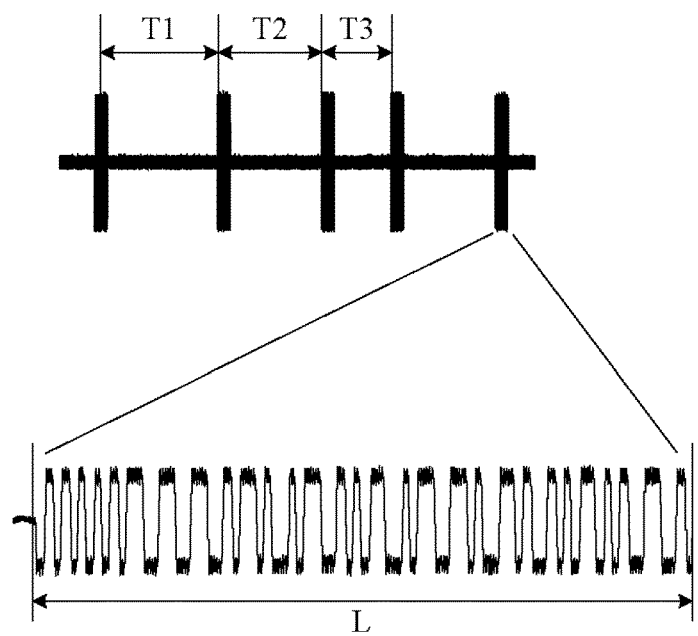
FIG. 6 is an explanatory diagram showing data signal of pulse train generated by a signal generator illustrated in FIG. 5.

FIG. 6 shows the area signal of pulse train generated by the first signal generator 84c1 to be passed through the boundary wire 72 that is corresponding to the binary data pulses sent from the charging ECU 84b. As shown, the area signal has a signal length L and is supplied to the boundary wire at random periods Tn. Although not shown, the second signal generator 84c2 generates similar signal.

Figure 4:
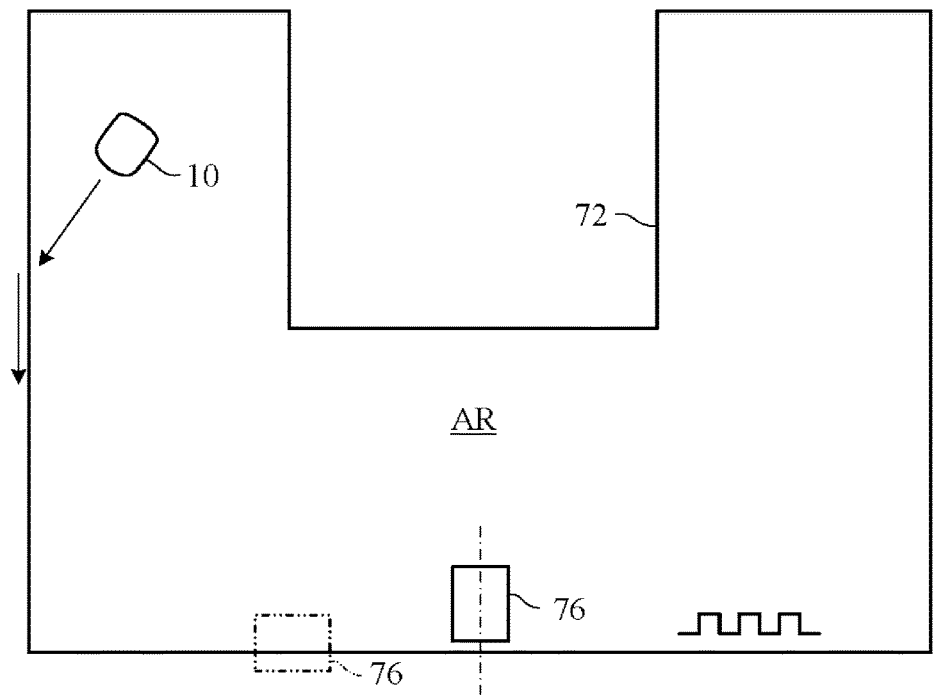
FIG. 4 is an explanatory diagram showing a working area (delimited by a boundary wire) of the utility vehicle illustrated in FIG. 1.

The detection of the working area AR shown in FIG. 4 will then be explained.

When electric current of the data signal shown in FIG. 6 is supplied to the boundary wire 72 by the first signal generator 84c1, a right-handed magnetic field is generated around the boundary wire 72 (Ampere's right-hand screw rule). The magnetic field intensity detected at this time differs depending on the total length of the boundary wire 72 and also differs with distance of the vehicle 10 from the boundary wire 72.

Figure 7:
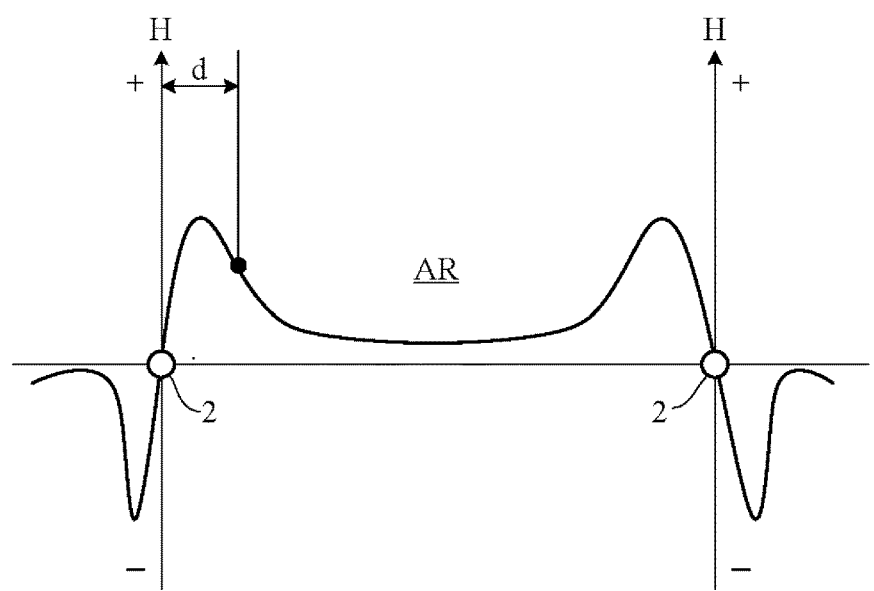
FIG. 7 is an explanatory diagram showing relationship between distance from the boundary wire and magnetic field strength generated by the data signal of FIG. 6.

FIG. 7 is a diagram showing relationship between distance d from the boundary wire 72 and magnetic field strength H. As indicated in FIG. 7, magnetic field strength H varies with distance d from the boundary wire 72. Specifically, magnetic field strength H is 0 above the boundary wire 2, positive inside the working area AR, and negative outside the same.

When work is in progress, the ECU 44 reads outputs of the magnetic sensors 36L, 36R and detects the position of the vehicle 10 in the working area AR. Specifically, the ECU 44 determines whether the vehicle 10 is inside or outside the working area AR and detects distance of the vehicle 10 from the boundary wire 72.

More specifically, the ECU 44 reads outputs of the magnetic sensors 36L, 36R and when the outputs are minus, drive the vehicle 10 to turn toward inside the working area AR at a random angle based on, for example, the output of the angular velocity sensor 46. As a result, work can be carried out inside the working area AR while the vehicle 10 is being driven to run straight forward at random direction, for example.

In the present embodiment, the vehicle 10 is controlled to operate in work mode and return mode in response to control commands sent from the ECU 44 in accordance with programs prepared beforehand and memorized in the memory 44c. In work mode, the vehicle 10 works (mows lawn or grass) while autonomously navigating in the working area AR. In return mode, the vehicle 10 is returned to the charging station 76 when the battery 32 requires charging. In work mode or return mode, the vehicle 10 is sometimes controlled to trace along the boundary wire 72. For example, this trace mode is executed before work mode to ascertain the working area AR.

Figure 8:
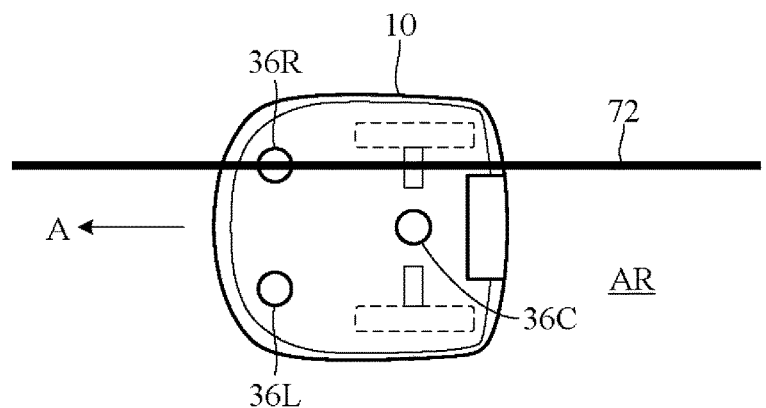
FIG. 8 is an explanatory diagram showing operation in trace mode of the vehicle illustrated in FIG. 1.

FIG. 8 is a diagram showing operation of the vehicle 1 in trace mode. As shown in FIG. 8, in trace mode the vehicle 1 is driven by commands from the ECU 44 to circuit along the boundary wire 72 with one of the pair of magnetic sensors 36R and 36L (e.g., 36L) positioned inside the boundary wire 72 and so that the other magnetic sensor (e.g., 36R) moves above the boundary wire 72 in the direction of arrow A. Specifically, the ECU 44 monitors output of the magnetic sensor 36R and controls operation of the drive motors 26L and 26R so that magnetic field strength H detected by the magnetic sensor 36R stays at 0.

For example, when magnetic field strength H detected from the output of the magnetic sensor 36R becomes positive, the vehicle 10 is turned rightward by decelerating right drive motor 26R and accelerating left drive motor 26L. On the other hand, when magnetic field strength H detected from the output of the magnetic sensor 36R becomes negative, the vehicle 10 is turned leftward by accelerating the right drive motor 26R and decelerating the left drive motor 26L. As a result, the right magnetic sensor 36R is brought near the boundary wire 72 and magnetic field strength H detected by the right magnetic sensor 36R is maintained at 0, so that the vehicle 10 can run on the boundary wire 72.

Trace mode is started from a state in which the terminals 34 of the vehicle 10 are connected to the terminals 86 of the charging station 76 and ends when the terminals 34 again connect to the terminals 86 after the vehicle 10 makes a circuit along the boundary wire 72. Position of the vehicle 10 from the start to the end of trace mode is successively detected from the output of the GPS receiver 54.

Based on the outputs of the GPS receiver 54 and the direction sensor 52, the ECU 44 generates a map of the working area AR (working area map MP) whose origin (starting point) is set at the charging station 76 based on the working area boundary line identified in trace mode.

Now to review the object of this invention, when, for example, the charging station 76 is located on the boundary wire 72 as indicated by imaginary lines in FIG. 4, the vehicle 10 can be easily returned to the charging station 76 by driving (trace-driving) the vehicle 10 along the boundary wire 72 during return mode in the foregoing manner based on detection values of the magnetic sensors 36.

However, since this requires the charging station 76 to be installed on the boundary wire 72 in parallel orientation, installation of the charging station 76 is severely restricted. The aim of this invention is therefore to enhance freedom of installation of the charging station 76.

Figure 9:
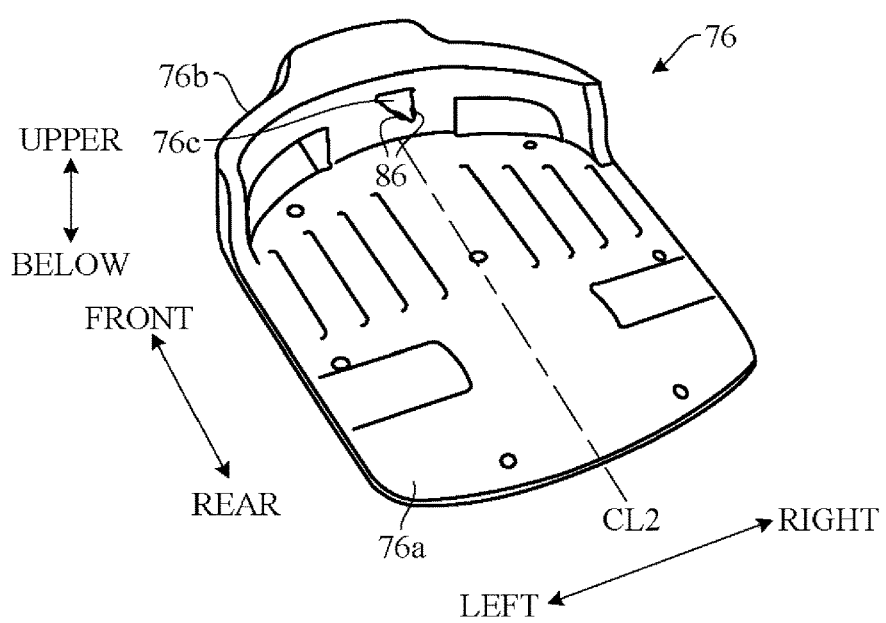
FIG. 9 is a perspective diagram illustrating the physical structure of the charging station according to the embodiment.

FIG. 9 is a perspective diagram illustrating the physical structure of the charging station 76 according to this embodiment. For convenience in the following, three orthogonal directions shown in the drawing are respectively defined as forward-rearward direction (length direction), lateral direction (width direction) and vertical direction (height direction) of the charging station 76.

As seen in FIG. 9, the charging station 76 has a base plate 76a of substantially the same size as the vehicle 10 for retaining the vehicle 10 during charging, a guide 76b erected at the front end of the base plate 76a for constraining position of the vehicle 10 during charging, and a substantially triangular terminal unit 76c projecting rearward from an upper and laterally middle part of the guide 76b.

The terminal unit 76c is configured to be insertable between the pair of left-right battery charging terminals 34 of the vehicle 10, and the pair of left-right terminals 86 of the charging station 76 is symmetrically provided with respect to a longitudinal direction axis CL2 passing through the center of the charging station 76, whereby the structure enables charging of the onboard battery 32 through the terminals 86 and 34.

As shown in FIG. 4, in this embodiment the charging station 76 is installed inside or outside, here inside, the working area AR, and in an orientation perpendicular to the boundary wire 72.

In the charging station 76, the aforesaid battery charging unit 84 is mounted on a circuit board (not shown) accommodated inside the guide 76b, and the battery charging unit 84 has connected thereto the docking wire 90 for guiding the vehicle 10 to the docking position for docking with the charging terminals 86 and the station wire 92 for, in advance of the docking, guiding the utility vehicle 10 by enabling it to recognize and approach the position of the charging station 76.

Figure 10:
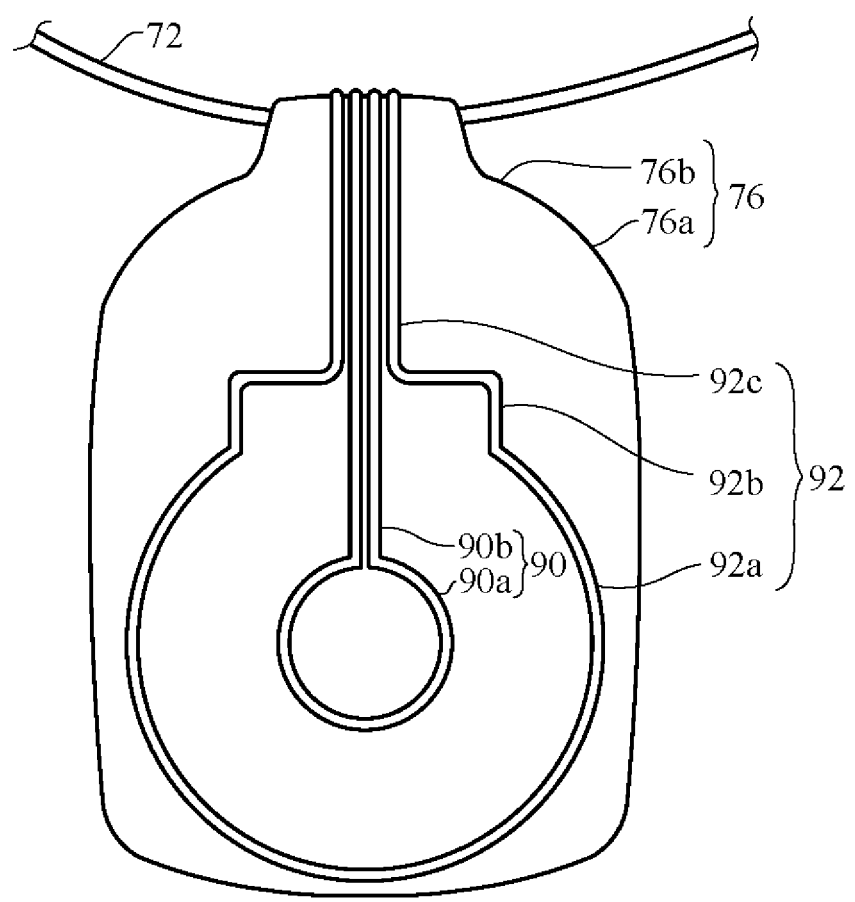
FIGS. 10 to 12 are top plan views of a base plate of the charging station shown in FIG. 9.
Figure 11:
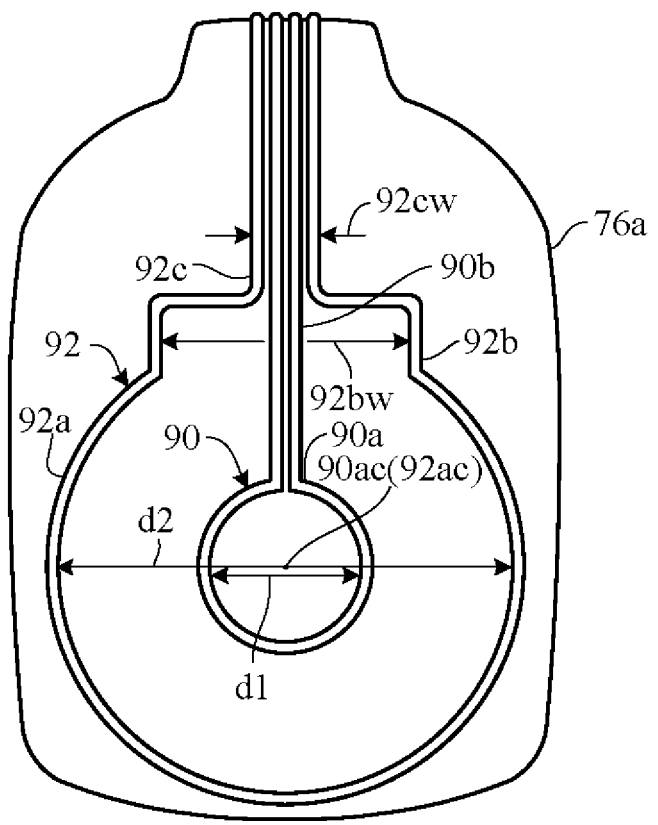
Figure 12:
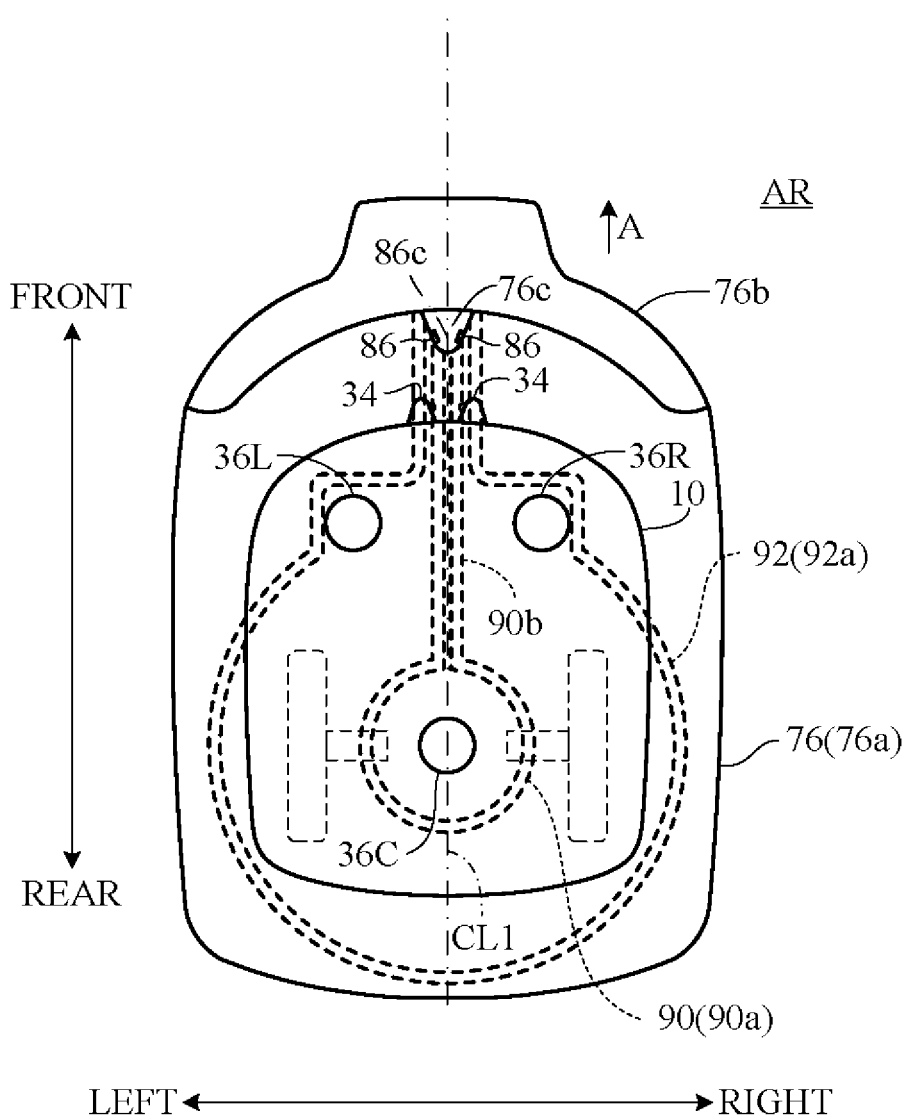

FIGS. 10 to 12 are top views of the base plate 76a of the charging station 76. In FIGS. 10 and 11, the base plate 76a is shown only in outline.

As illustrated, the charging station incorporates the docking wire 90 and station wire 92 in addition to the base plate 76a.

The docking wire 90 is installed in or near the base plate 76a, and in a particular arrangement is mounted (laid) as fastened by hooks or the like on an undersurface of the base plate 76a to be connected to the power supply 80 independently of the boundary wire 72, and, as viewed from above, has a (first) loop 90a of loop diameter d1 and (first) projecting segments 90b continuous with the loop 90a that project toward one end of the base plate 76a symmetrically with respect to the axis CL2 connecting a midpoint 86c (FIG. 12) of the pair of charging terminals 86 attached to the base plate 76a and a center of the loop 90a.

Thus, the docking wire 90 is configured to extend linearly from the circuit board accommodated in the guide 76b at one end (front end) of the base plate 76a toward an opposite end of the base plate 76a to form one projecting segment 90b, form the loop 90a of diameter d1, and again extend linearly to form the other projecting segment 90b. Separation between the projecting segments 90b of the docking wire 90 is of a tiny dimension.

The station wire 92 is installed in or near the base plate 76a, and in a particular arrangement is mounted (laid) as fastened by hooks or the like on an undersurface of the base plate 76a to be connected to the power supply 80 independently of the boundary wire 72 and the docking wire 90, and, as viewed from above, has a (second) loop 92a of loop diameter d2 larger that the diameter d1 of the loop 90a of the docking wire 90, has square (second) projecting segments 92b that are continuous with the loop 92a and symmetrical with respect to the projecting segments 90b of the docking wire 90, and additionally has second projecting segments 92c that are continuous with the projecting portions 92b and symmetrical with respect to the projecting segments 90b of the docking wire 90 and have a width 92cw smaller than a width 92bw of the projecting portions 92b.

Thus, the station wire 92 is configured to extend linearly from the circuit board accommodated in the guide 76b at one end of the base plate 76a toward the other end of the base plate 76a to form one second (additional) projecting segment 92c, bend at a right angle into one projecting portion 92b, form the loop 92a of diameter d2, again extend linearly to form the other projecting portion 92b, and again bend at a right angle to form the other second projecting segment 92c.

Moreover, as illustrated, the center 90ac of the loop 90a of the docking wire 90 is positioned to coincide, or substantially coincide, with the center 92ac of the loop 92a of the ST wire 92.

The diameter d2 of the loop 92a of the station wire 92 is defined to have a value (e.g., 60 cm) exceeding the width (e.g., 55 cm) of the vehicle 10, and the width 92bw of the projecting portions 92b is defined as a value exceeding the distance (e.g., 18 cm) between the first and second magnetic sensors 36L and 36R.

The diameter d1 of the loop 90a of the docking wire 90 is defined to have a value (e.g., 10 cm) exceeding the diameter of the third magnetic sensor 36C.

Operation of the charging station for a utility vehicle according to this embodiment is explained in the following with reference to FIG. 13 and following figures.

Figure 13:
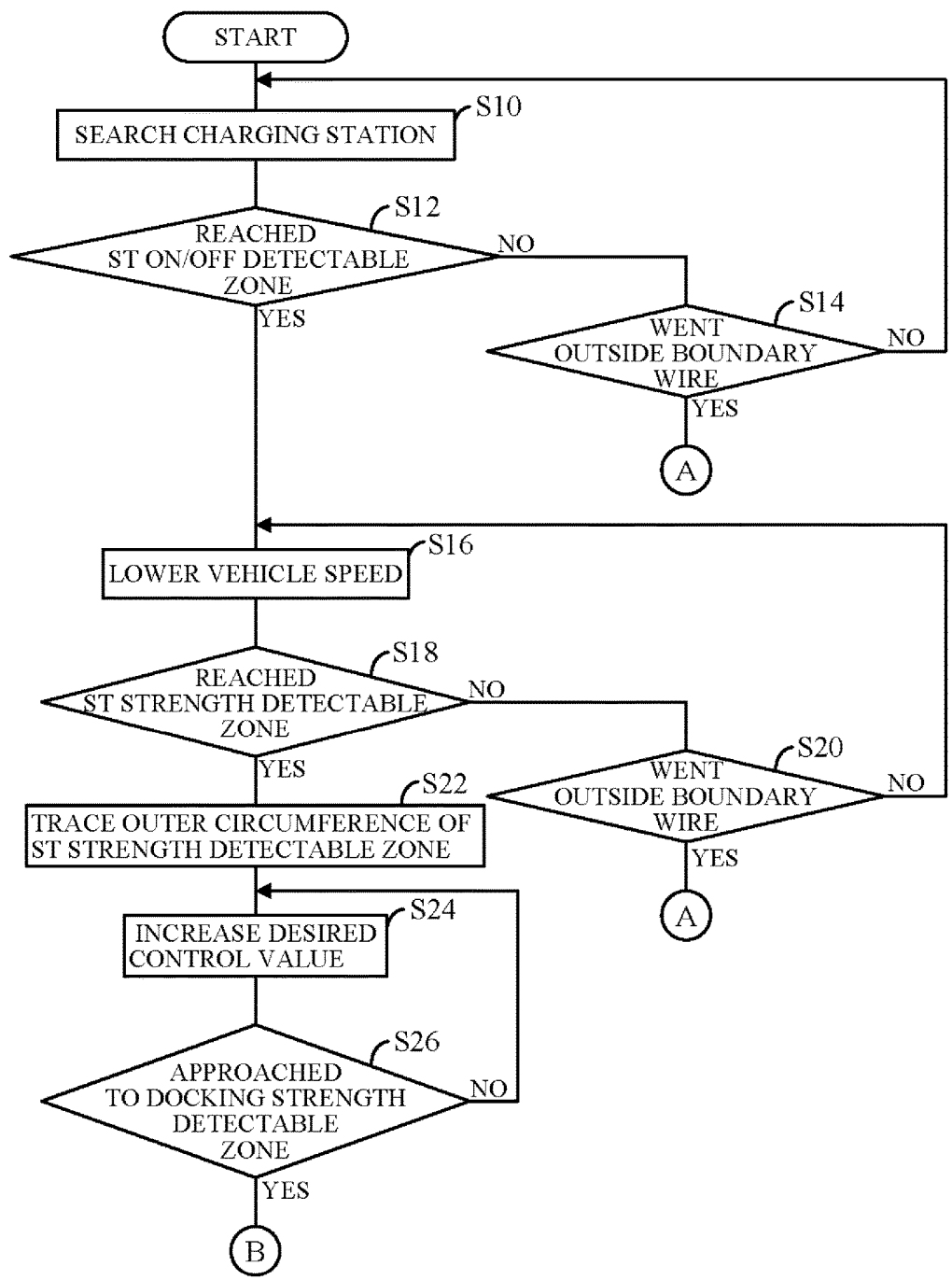
FIG. 13 is a flowchart showing the former half of operation of the ECU (control unit) in FIG. 3.
Figure 14:
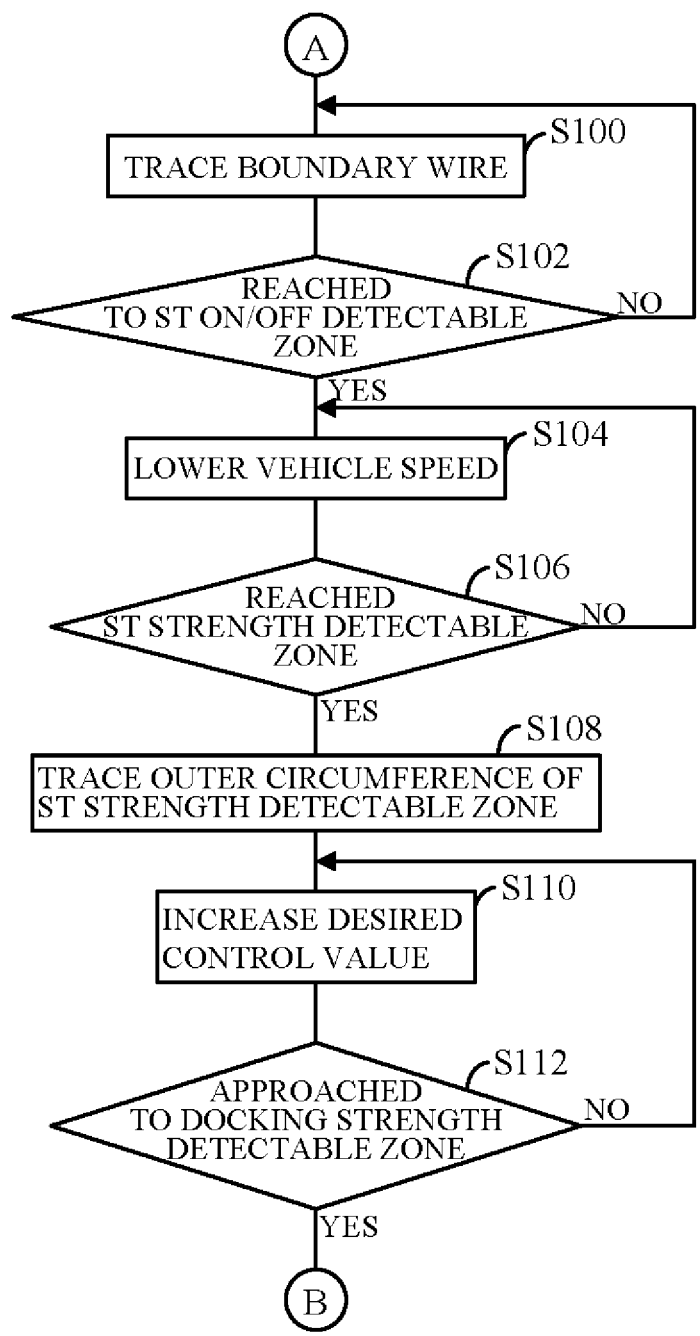
FIG. 14 is a flowchart showing operation similar to that of FIG. 13.
Figure 15:
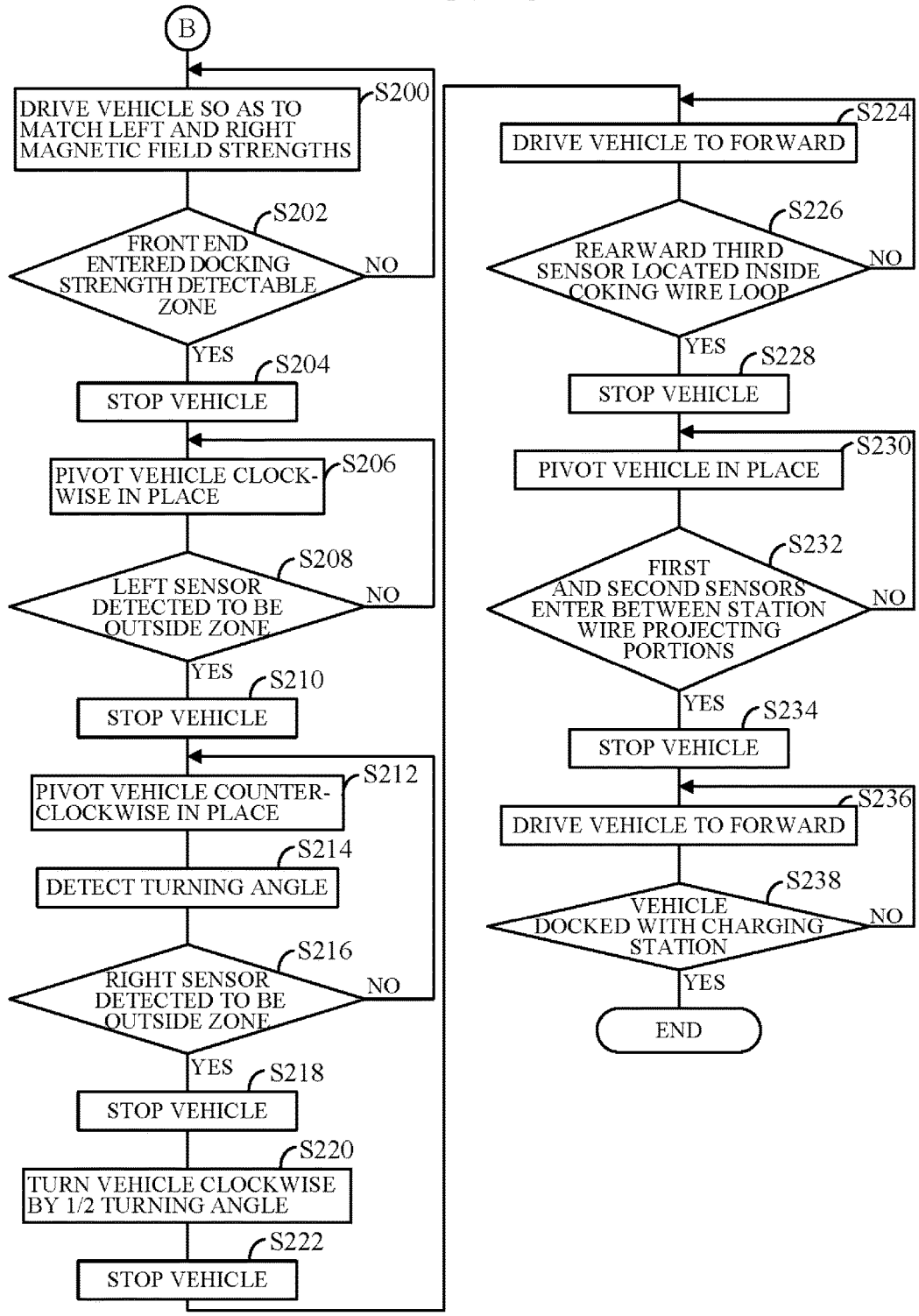
FIG. 15 is a flowchart showing the latter half of operation illustrated in FIG. 13.
Figure 16:
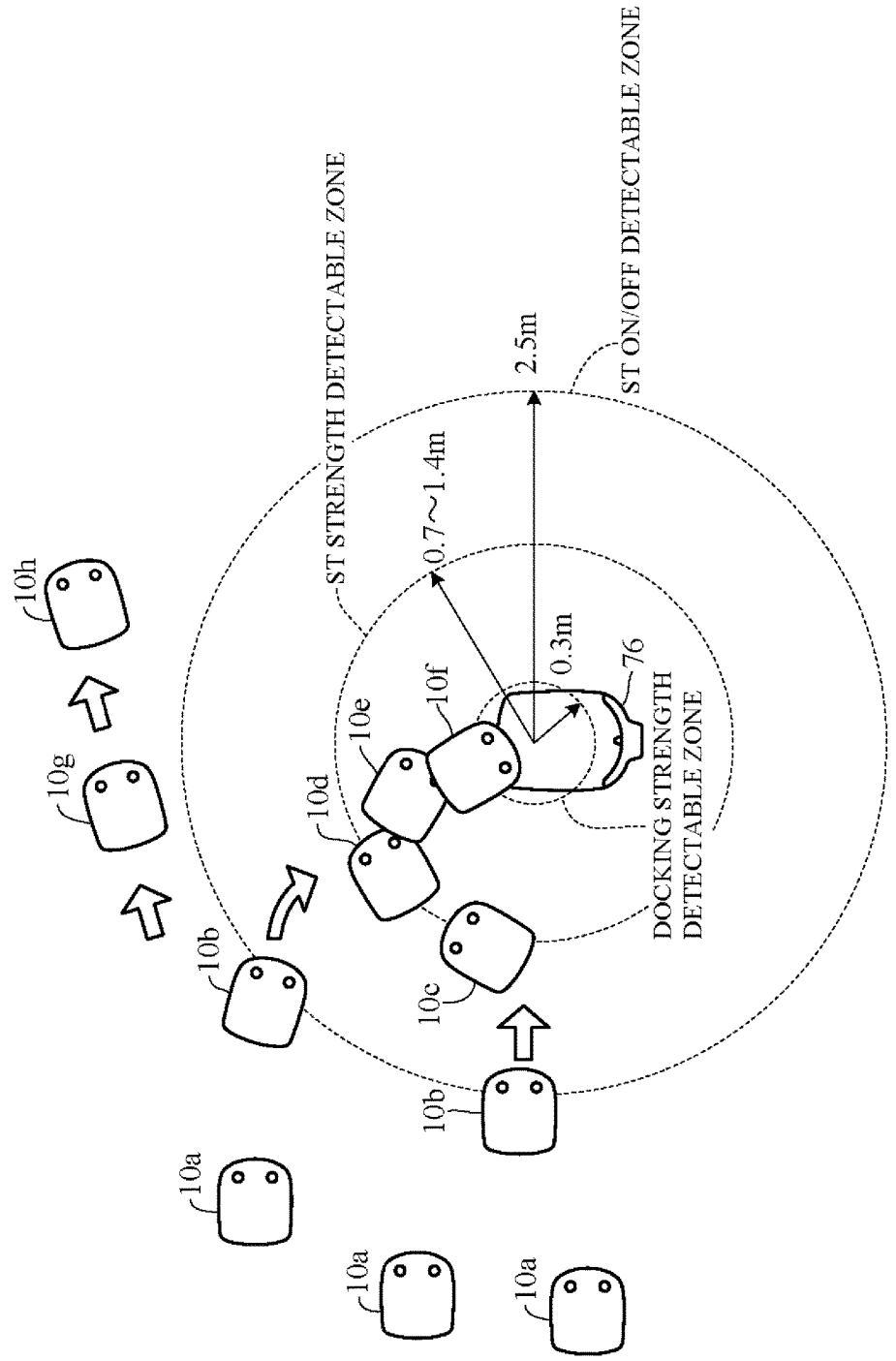

FIG. 13 is a flowchart showing the former half of operations of the charging station for a utility vehicle according to this embodiment, FIG. 14 is a flowchart showing similar operations, FIG. 15 is a flowchart showing the latter half of the operations, and FIGS. 16 and 17 are explanatory diagrams for explaining the operations at that time.

The flowcharts of FIGS. 13 to 15 are executed by the ECU 44. As shown in FIG. 3, the ECU 44 has the CPU (microprocessor) 44a and the memory 44c, wherein the CPU (microprocessor) 44a is configured to function as a control unit (or control means) 44a1. It is actually the control unit 44a1 that performs the processing of FIGS. 13 to 15.

Turning first to an explanation with reference to FIG. 13, in S10, the vehicle 10 is driven (straight forward) in search of the charging station 76, whereafter the program goes to S12, in which the outputs of the magnetic sensors 36 are used to determine whether an ST (station) ON/OFF detectable zone (shown in FIG. 16) was reached. The ST ON/OFF detectable zone is, for example, defined to have a radius of 2.5 m. In FIG. 16, positions of the vehicle 10 over time are assigned subscripted symbols such as 10a, 10b, 10c, 10d, 10e and so on.

When the vehicle 10 moved from 10a to 10b in FIG. 16, the result in S12 in the flowchart of FIG. 13 is YES. On the other hand, when it moved from 10a to 10g and 10h, or similar, the result in S12 is NO, and the program goes to S14, in which whether the vehicle 10 went outside the boundary wire 72 is determined. When the result in S14 is NO, the program returns to S10, and when YES, goes to the flowchart of FIG. 14.

Since, as shown in FIG. 16, the vehicle 10 strays away from the charging station 76 in such a case, control is effected in accordance with the flowchart of FIG. 14, explained later, to detect the boundary wire 72 and perform a charging station search operation.

When the result in S12 of the flowchart of FIG. 13 is YES, the program goes to S16 to lower the running speed of the vehicle 10 and next to S18 to determine whether the vehicle 10 reached an ST (station strength detectable zone (FIG. 16). The ST strength detectable zone is, for example, defined to have a radius of 0.7 to 1.4 m.

When the result in S18 is NO, the program goes to S20, in which processing similar to that in S14 is performed, and when YES, goes to S22, in which running of the vehicle 10 is controlled so as to trace the outer circumference of the ST strength detectable zone.

The driving of the vehicle 10 as shown in FIG. 16, i.e., to advance it from position 10a through 10b to 10c and then, by the processing of S22, drive it ahead to 10d in the manner of tracing the outer circumference of the ST strength detectable zone, is to confirm that the vehicle 10 reached this zone.

In the flowchart of FIG. 13, the program next goes to S24, in which desired control value (strength) during tracing is increased, and next to S26, to determine whether a docking strength detectable zone (FIG. 16) was closely approached. Every time the result in S26 is NO, the program returns to S24 to repeat the aforesaid processing.

This means that the vehicle 10 is gradually driven forward from position 10d to positions 10e and 10f in FIG. 16, whereafter whether the docking strength detectable zone (FIG. 16) is near is determined. The docking strength detectable zone is, for example, defined to have a radius of 0.3 m.

FIGS. 17A to 17E are explanatory diagrams similar to FIG. 16, and the aforesaid processing of the flowchart of FIG. 13 corresponds to the operations FIG. 17A, FIG. 17B and FIG. 17C.

Now turning to an explanation of FIG. 14, the flowchart in this figure shows operations performed after exiting the flowchart of FIG. 13 at S14 or S20.

In S100, the boundary wire 72 is traced. Specifically, the boundary wire 72 is first detected based on the output of the GPS sensor 54, whereafter, similarly to the operation during trace running described earlier, operation of the vehicle 10 is controlled to run along the boundary wire 72.

Next, in S102, similarly to in S12 of the flowchart of FIG. 13, whether the ST ON/OFF detectable zone was reached is determined. When the result in S102 is NO, the program returns to S100 to repeat the aforesaid processing, and when YES, advances through S104 onward to perform the indicated processing. As the processing in these steps is the same as that explained regarding the flowchart of FIG. 13, explanation is omitted here.

Now follows an explanation of processing of the flowchart of FIG. 15 showing docking operations. This flowchart is executed when the result in S26 of the flowchart of FIG. 13 or in S112 of the flowchart of FIG. 14 is YES.

First, in S200, the vehicle 10 is driven so as to match the magnetic field strengths detected by the first (left) and second (right) magnetic sensor 36L and 36R, whereafter the program goes to S202 to determine whether the front end of the body 12 entered the docking strength detectable zone of the docking wire 90, and when the result is NO, returns to S200, and when YES, goes to S204 to stop the vehicle 10.

In other words, whether the vehicle 10 is in the state shown in FIG. 17C is determined, and when the result is YES, the utility vehicle 10 is once stopped.

Next, in S206, the vehicle 10 is pivoted clockwise in place (as viewed from above), whereafter the program goes to S208 to determine whether the first magnetic sensor 36L on the left side detected itself to be outside the docking strength detectable zone, i.e., whether the left front of the body 12 went outside the zone. When the result in S208 is NO, the program returns to S206 to continue the aforesaid processing.

Next, the program goes to S210, in which the vehicle 10 is once stopped, next to S212, in which it is pivoted counterclockwise in place (as viewed from above), then to S214, in which turning angle is detected, and thereafter to S216 to determine whether the second magnetic sensor 36R on the right side detected itself to be outside the docking strength detectable zone, i.e., whether the right front of the body 12 went outside the zone.

When the result in S216 is NO, the program returns to S212 to continue the aforesaid processing, and when YES, goes to S218, in which the vehicle 10 is once stopped. Next, the program goes to S220, in which the vehicle 10 is turned clockwise by ½ the turning angle detected in S214, and to S222, in which it is once stopped.

The processing from S206 to S222 means processing for determining the angle by which the front end of the body 12 in FIG. 17C is just outside the docking strength detectable zone on the left and right, and, by calculating the half-angle thereof, operating the vehicle 10 to directly face the docking strength detectable zone, i.e., to align the orientation of the utility vehicle 10 with the center of the loop 90a of the docking wire 90, so that when the vehicle 10 is advanced in this orientation, the body center line CL1 extending in the forward-rearward direction of the body 12 is made to coincide with the center of the loop 90a of the docking wire 90.

In the flowchart of FIG. 15, the program next goes to S224 to drive the vehicle 10 forward and to S226 to determine whether the rearward third magnetic sensor 36C is located inside the docking wire 90, more specifically, inside the loop 90a. This is determined by comparing output of the third magnetic sensor 36C with a predetermined value. When the result in S226 is NO, the program returns to S224, and when YES, goes to S228 to once stop the utility vehicle 10.

Next, in S230, the vehicle 10 is pivoted in place around the third magnetic sensor 36C (i.e., the center 90ac of the loop 90a of the docking wire 90), whereafter the program goes to S232 to determine whether the first and second magnetic sensors 36L and 36R on the front side both entered between the projecting portions 92b of the station wire 92. When the result in S232 is NO, the program returns to S230 to pivot the vehicle 10 toward the side of increasing detection strength, and when YES, goes to S234 to once stop the vehicle 10.

This corresponds to the state shown in FIG. 17D.

Next, the program goes to S236 to drive the vehicle 10 forward and determine from the output of the current sensor 62 whether the charging terminals 86 of the charging station 76 and the battery charging terminals 34 of the vehicle 10 docked.

When the result in S238 is NO, the program returns to S236, and when YES, a charging state is determined to be established and the remaining processing steps are skipped. This corresponds to the state shown in FIG. 17E.

Thus, in the processing from FIG. 13 to FIG. 15, the ECU 44, more exactly its control unit 44a1, controls running of the vehicle 10 through operation of the drive motors 26 based on the outputs of the first, second and third magnetic sensors 36L, 36R and 36C so as to position the third magnetic sensor 36C inside the loop 90a of the docking wire 90 and position the first and second magnetic sensors 36L and 36R inward of the projecting portions 92b of the ST wire 92.

More specifically, the control unit 44a1 controls running of the vehicle 10 based on the outputs of the first, second and third magnetic sensors 36L, 36R and 36C so as to bring the body center line CL1 extending in the forward-rearward direction of the body 12 into coincidence with the axis CL2 connecting the midpoint 86c of the charging terminals 86 and the center of the loop 90a, whereby the third magnetic sensor 36C comes to be positioned inside the loop 90a of the docking wire 90 and the first and second magnetic sensors 36L and 36R come to be positioned between the projecting portions 92b of the station wire 92.

As stated above, the present embodiment is configured to have a charging station (76) for a utility vehicle (10) installed at a boundary of a working area (AR) for charging an onboard battery (32) of the vehicle (10) that detects a magnetic field generated during flow of electric current through a boundary wire (72) laid around the working area and connected to an electric power supply (80) and is driven by electric motors (26) to run the working area based on the detected magnetic field, comprising: a base plate (76a) that is installed at (inside or outside) the working area to retain the vehicle (10) and provided with a pair of charging terminals (86) connectable with battery charging terminals of the onboard battery (32) of the vehicle (10); a first wire (90) that is installed at (in or near) the base plate (76a) and is connected to the electric power supply (86) independently of the boundary wire (72), the first wire (90) having a first loop (90a) that loops with a first loop diameter (d1) and first projecting segments (90b) that project from the first loop (90a) toward the base plate (76a) symmetrically with respect to an axis (CL2) connecting a midpoint (86c) of the pair of charging terminals (86) and a center (90ac) of the first loop (90a); and a second wire (92) that is installed at (in or near) the base plate (76a) and is connected to the electric power supply (86) independently of the boundary wire (72) and the first wire (90), the second wire (92) having a second loop (92a) that loops with a second loop diameter (d2) that is larger than the first loop diameter (d1) and second projecting segments (92b) that project from the second loop (92a) toward the base plate (76a) symmetrically with the first projecting segments (90b).

With this, it becomes possible to install the charging station 76 at an arbitrary location and freedom of installation is enhanced. As the first wire 90 and the second wire 92 are each provided with a loop 90a, 92a, accuracy at the time of detecting the position of the charging station 76 can be improved by detecting the magnetic fields generated by electric current flowing through the first wire 90 and the second wire 92.

In the charging station, the center (90ac) of the first loop (90a) of the first wire (90) is positioned to coincide with a center (92ac) of the second loop (92a) of the second wire (92).

With this, in addition to the effects and advantages, it becomes possible to make configuration of the charging station 76 compact.

In the charging station, the second loop diameter (d2) of the second loop (92a) of the second wire (92) is larger than a width of the vehicle (10).

With this, in addition to the effects and advantages, it becomes possible to enhance detection accuracy of the charging station 76 from a remote location.

In the charging station, the vehicle has a first magnetic sensor (36L) and a second magnetic sensor (36R) installed at positions laterally symmetrical with respect to a body center line (CL1) extending in a forward-rearward direction of a vehicle body (12), and a width (92bw) of the projecting portions (92b) is larger than a distance between the first and second magnetic sensors (36L, 36R).

With this, in addition to the effects and advantages, it becomes possible to further enhance detection accuracy of the charging station 76.

In the charging station, the second wire (92) has additional projecting segments (92c) that are continuous with the second projecting portions (92b) and symmetrical with respect to the second projecting segments 92b) of the second wire (92) and have a width (92cw) which is smaller than a width (92bw) of the second projecting portions (92b).

With this, in addition to the effects and advantages, it becomes possible to further enhance detection accuracy of the charging station 76.

In the charging station, the vehicle (10) has a first magnetic sensor (36L) and a second magnetic sensor (36R) installed at positions laterally symmetrical with respect to a body center line (CL1) extending in a forward-rearward direction of a vehicle body (12), and a third magnetic sensor (36C) installed on the body center line (CL1) at a location remote from the firs and second sensors (36L, 36R); the first, second and third magnetic sensors (36) producing an output indicating magnitude of magnetic field generated along the boundary wire (72), first wire (90) and second wire (92), and the charging station further including: an electronic control unit (ECU 44) having a microprocessor (CPU 44a) and a memory (44c), wherein the microprocessor is configured to function as: a control unit (44a1, S10-S26, S100-S112, S200-S238) configured to control operation of the electric motor (26) to guide the vehicle (10) to the charging station (76).

With this, in addition to the effects and advantages, it becomes possible to guide the vehicle 10 to the charging station 76 accurately.

In the charging station, the control unit (44a1) controls operation of the electric motor (26) based on the outputs of the first, second and third magnetic sensors (36L, 36R, 36C) so as to bring the body center line (CL1)) into coincidence with an axis CL2 connecting the midpoint (86c) of the charging terminals (86) and the center of the first loop (90a), such that the third magnetic sensor (36C) comes to be positioned inside the first loop (90a) of the first wire (90) and the first and second magnetic sensors (36L, 36R) come to be positioned between the second projecting portions (92b) of the second wire (92)(S200-S238).

With this, in addition to the effects and advantages, it becomes possible to guide the vehicle 10 to the charging station 76 more accurately.

In the charging station, the control unit (44a1) controls operation of the electric motor (26) to detect the second wire (92) and then to detect the first wire (90).

With this, in addition to the effects and advantages, it becomes possible to guide the vehicle 10 to the charging station 76 without fail.

In the charging station, the control unit (44a1) controls operation of the electric motor (26) to detect the boundary wire (72) when failing to detect the second wire (92) and then to detect the second wire (92).

With this, in addition to the effects and advantages, it becomes possible to guide the vehicle 10 to the charging station 76 without fail.

In the charging station, the control unit (44a1) controls operation of the electric motor (26) to position the center (90ac) of the first loop (92a) of the first wire (92) on the body center line (CL1) (S224-S238) based on the outputs of the first and second magnetic sensors (36L, 36R).

With this, in addition to the effects and advantages, it becomes possible to guide the vehicle 10 to the charging station 76 more accurately.

In the charging station, the control unit (44a1) controls operation of the electric motor (26) to position the center (90ac) of the first loop (92a) of the first wire (92) on the body center line (CL1) (S224-S238) based on the outputs of the first and second magnetic sensors (36L, 36R), to position the third magnetic sensor (36C) on the center (90ac) of the first loop (90a) of the first wire (90), and to turn the vehicle body (12) left or right, such that the third magnetic sensor (36C) comes to be positioned inside the first loop (90a) of the first wire (90) and the first and second magnetic sensors (36L, 36R) come to be positioned between the second projecting portions (92b) of the second wire (92)(S200-S238).

With this, in addition to the effects and advantages, it becomes possible to guide the vehicle 10 to the charging station 76 more accurately.

In the above, it should be noted that configurations or connection of the charger 84, base plate 76a and docking wire 90 and station wire 92 of the charger station 76 are examples and should not be limited thereto.

It should also be noted that the configurations of the loops 92, 92a of docking wire 90 and station wire 92 are examples and should not be limited thereto.

It should further be noted that, although the utility vehicle is applied for a lawn mowing or grass mowing, it may be applied to any other type of works.

While the present invention has been described with reference to the preferred embodiments thereof, it will be understood, by those skilled in the art, that various changes and modifications may be made thereto without departing from the scope of the appended claims.

What is claimed is:

1. A charging station for a utility vehicle installed at a boundary of a working area for charging an onboard battery of the vehicle that detects a magnetic field generated during flow of electric current through a boundary wire laid around the working area and is driven by electric motors to run the working area based on the detected magnetic field, the charging station comprising:
   a base plate that is installed at the working area to retain the vehicle;
   a pair of charging terminals connectable with battery charging terminals of the onboard battery of the vehicle;
   a charger connected to an electric power supply, and configured to apply a voltage to the charging terminals when the vehicle is at the charging station and the battery charging terminals of the onboard battery of the vehicle are connected to the charging terminals;
   a first wire that is installed at the base plate and is connected to the charger independently of the boundary wire, the first wire having a first loop that loops with a first loop diameter and first projecting segments that project from the first loop toward one end of the base plate symmetrically with respect to an axis connecting a midpoint of the pair of charging terminals and a center of the first loop; and
   a second wire that is installed at the base plate and is connected to the charger independently of the boundary wire and the first wire, the second wire having a second loop that loops with a second loop diameter that is larger than the first loop diameter and second projecting segments that project from the second loop toward the one end of the base plate symmetrically with the first projecting segments;
   wherein the charger is configured to supply an area signal to the second wire to delineate the charging station to the vehicle when the vehicle is remote from the charging station, and to supply an area signal to the first wire to guide the vehicle to a docking position for docking with the pair of charging terminals.

2. The charging station according to claim 1, wherein the center of the first loop of the first wire is positioned to coincide with a center of the second loop of the second wire.

3. The charging station according to claim 1, wherein the second loop diameter of the second loop of the second wire is larger than a width of the vehicle.

4. The charging station according to claim 1, wherein the vehicle has a first magnetic sensor and a second magnetic sensor installed at positions laterally symmetrical with respect to a body center line extending in a forward-rearward direction of a vehicle body, and a width of the second projecting segments is larger than a distance between the first and second magnetic sensors.

5. The charging station according to claim 1, wherein the second wire has additional projecting segments that are continuous with the second projecting segments and symmetrical with respect to the second projecting segments of the second wire and have a width which is smaller than a width of the second projecting segments.

6. The charging station according to claim 1, wherein the vehicle has a first magnetic sensor and a second magnetic sensor installed at positions laterally symmetrical with respect to a body center line extending in a forward-rearward direction of a vehicle body, and a third magnetic sensor installed on the body center line at a location remote from the first and second sensors; the first, second and third magnetic sensors producing an output indicating magnitude of magnetic field generated along the boundary wire, the first wire, and the second wire,
   and further including:
   an electronic control unit having a microprocessor and a memory, wherein the microprocessor is configured to function as:
     a control unit configured to control operation of the electric motors to guide the vehicle to the charging station.

7. The charging station according to claim 6, wherein the control unit controls operation of the electric motors based on the outputs of the first, second and third magnetic sensors so as to bring the body center line into coincidence with an axis connecting the midpoint of the charging terminals and the center of the first loop, such that the third magnetic sensor comes to be positioned inside the first loop of the first wire and the first and second magnetic sensors come to be positioned between the second projecting segments of the second wire.

8. The charging station according to claim 6, wherein the control unit controls operation of the electric motors to detect the second wire and then to detect the first wire.

9. The charging station according to claim 8, wherein the control unit controls operation of the electric motors to detect the boundary wire when failing to detect the second wire and then to detect the second wire.

10. The charging station according to claim 8, wherein the control unit controls operation of the electric motors to position the center of the first loop of the first wire on the body center line based on the outputs of the first and second magnetic sensors.

11. The charging station according to claim 10, wherein the control unit controls operation of the electric motors to position the center of the first loop of the first wire on the body center line based on the outputs of the first and second magnetic sensors, to position the third magnetic sensor on the center of the first loop of the first wire, and to turn the vehicle body left or right, such that the third magnetic sensor comes to be positioned inside the first loop of the first wire and the first and second magnetic sensors come to be positioned between the second projecting segments of the second wire.

12. A charging station for a utility vehicle installed at a boundary of a working area for charging an onboard battery of the vehicle that detects a magnetic field generated during flow of electric current through a boundary wire laid around the working area and is driven by electric motors to run the working area based on the detected magnetic field, the charging station comprising:
  a base plate that is installed at the working area to retain the vehicle and provided with a pair of charging terminals connectable with battery charging terminals of the onboard battery of the vehicle;
  a first wire that is installed at the base plate and is connected to a charger independently of the boundary wire, the first wire having a first loop that loops with a first loop diameter and first projecting segments that project from the first loop toward the base plate symmetrically with respect to an axis connecting a midpoint of the pair of charging terminals and a center of the first loop; and
  a second wire that is installed at the base plate and is connected to the charger independently of the boundary wire and the first wire, the second wire having a second loop that loops with a second loop diameter that is larger than the first loop diameter and second projecting segments that project from the second loop toward the base plate symmetrically with the first projecting segments;
  wherein the vehicle has a first magnetic sensor and a second magnetic sensor installed at positions laterally symmetrical with respect to a body center line extending in a forward-rearward direction of a vehicle body, and a third magnetic sensor installed on the body center line at a location remote from the first and second sensors;
  wherein the first, second, and third magnetic sensors produce an output indicating magnitude of magnetic field generated along the boundary wire, the first wire, and the second wire;
  wherein the vehicle has a microprocessor and a memory configured to function as a control unit configured to control operation of the electric motors to guide the vehicle to the charging station.

13. The charging station according to claim 12, wherein the control unit controls operation of the electric motors based on the outputs of the first, second, and third magnetic sensors so as to bring the body center line into coincidence with an axis connecting the midpoint of the charging terminals and the center of the first loop such that the third magnetic sensor comes to be positioned inside the first loop of the first wire, and the first and second magnetic sensors come to be positioned between the second projecting segments of the second wire.

14. The charging station according to claim 12, wherein the control unit controls operation of the electric motors to detect the second wire and then to detect the first wire.

15. The charging station according to claim 12, wherein the control unit controls operation of the electric motors to detect the boundary wire when failing to detect the second wire and then to detect the second wire.

16. The charging station according to claim 15, wherein the control unit controls operation of the electric motors to position the center of the first loop of the first wire on the body center line based on the outputs of the first and second magnetic sensors.

17. The charging station according to claim 16, wherein the control unit controls operation of the electric motors to position the center of the first loop of the first wire on the body center line based on the outputs of the first and second magnetic sensors, to position the third magnetic sensor on the center of the first loop of the first wire, and to turn the vehicle body left or right such that the third magnetic sensor comes to be positioned inside the first loop of the first wire and the first and second magnetic sensors come to be positioned between the second projecting segments of the second wire.

18. A charging station for charging a battery installed on a utility vehicle that is driven by electric motors to operate in a working area delineated by a boundary wire, the charging station comprising:
  a base plate to retain the vehicle during charging;
  a guide at a front end of the base plate to constrain a position of the vehicle during charging;
  a pair of charging terminals at the guide connectable with charging terminals of the vehicle when the vehicle is docked at the charging station;
  a station wire, in advance of docking the vehicle, to guide the vehicle to approach the charging station; and
  a docking wire to guide the vehicle to a docking position for docking;
  wherein the docking wire is installed at the base plate and is connected to a charger independently of the boundary wire, the docking wire having a first loop that loops with a first loop diameter and first projecting segments that project from the first loop toward the front end of the base plate symmetrically with respect to an axis connecting a midpoint of the pair of charging terminals and a center of the first loop;
  wherein the station wire is installed at the base plate and is connected to the charger independently of the boundary wire and the docking wire, the station wire having a second loop that loops with a second loop diameter that is larger than the first loop diameter and second projecting segments that project from the second loop toward the front end of the base plate symmetrically with the first projecting segments.

* * * * *